Oct. 10, 1944. T. O. MEHAN 2,360,005
KEY SET CONTROL MECHANISM FOR CALCULATING MACHINES
Filed Dec. 30, 1940 11 Sheets-Sheet 1

Oct. 10, 1944. T. O. MEHAN 2,360,005
KEY SET CONTROL MECHANISM FOR CALCULATING MACHINES
Filed Dec. 30, 1940 11 Sheets-Sheet 3

Inventor:
Thomas O. Mehan
By Williams,
Bradbury & Hinkle
Attys.

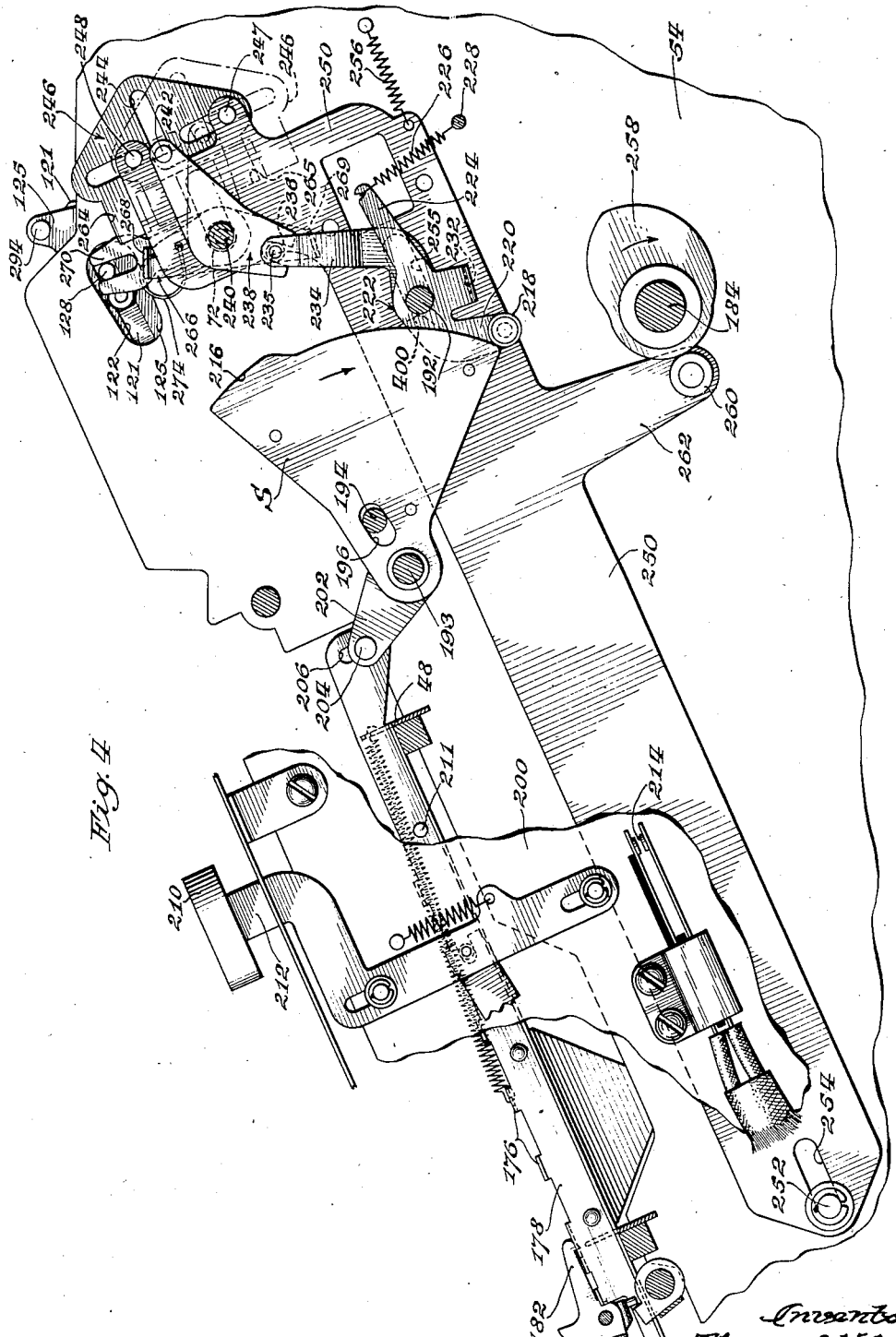

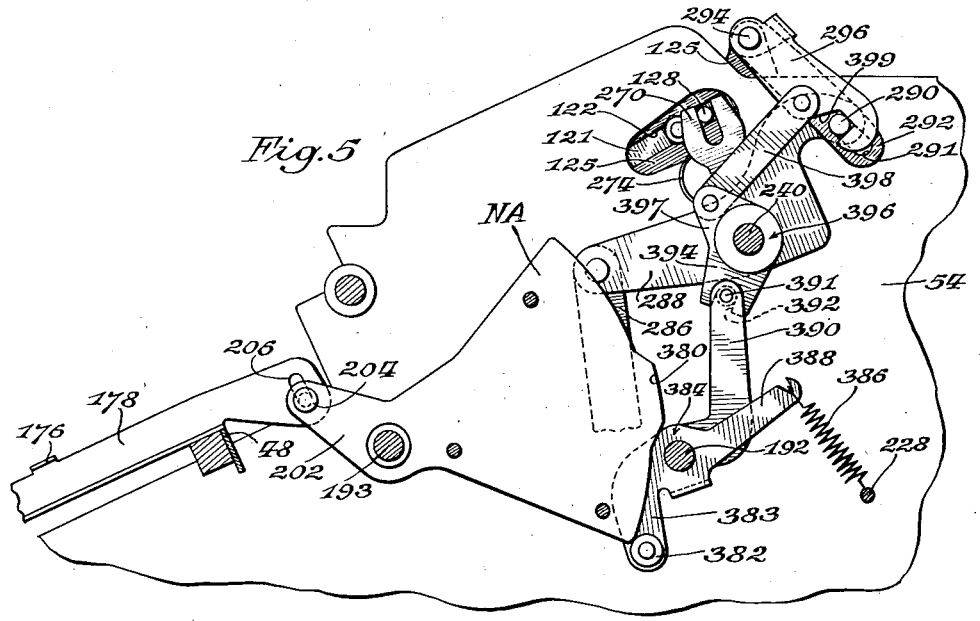
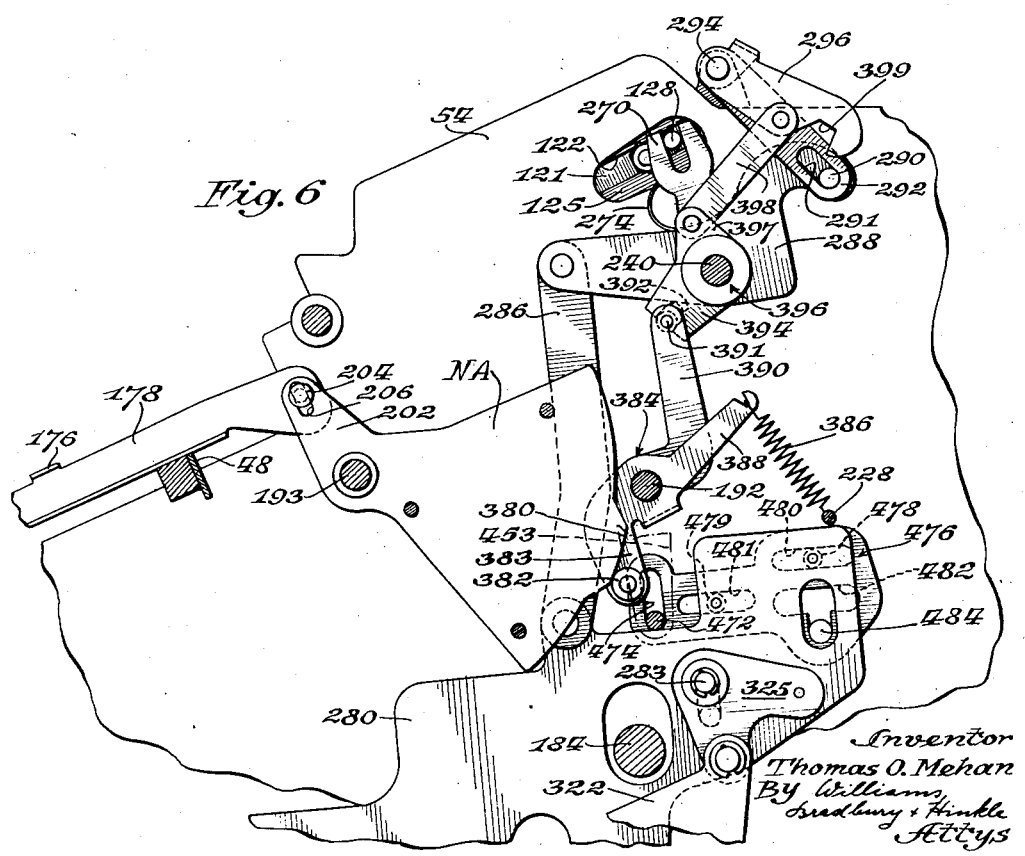

Oct. 10, 1944. T. O. MEHAN 2,360,005
KEY SET CONTROL MECHANISM FOR CALCULATING MACHINES
Filed Dec. 30, 1940 11 Sheets-Sheet 6
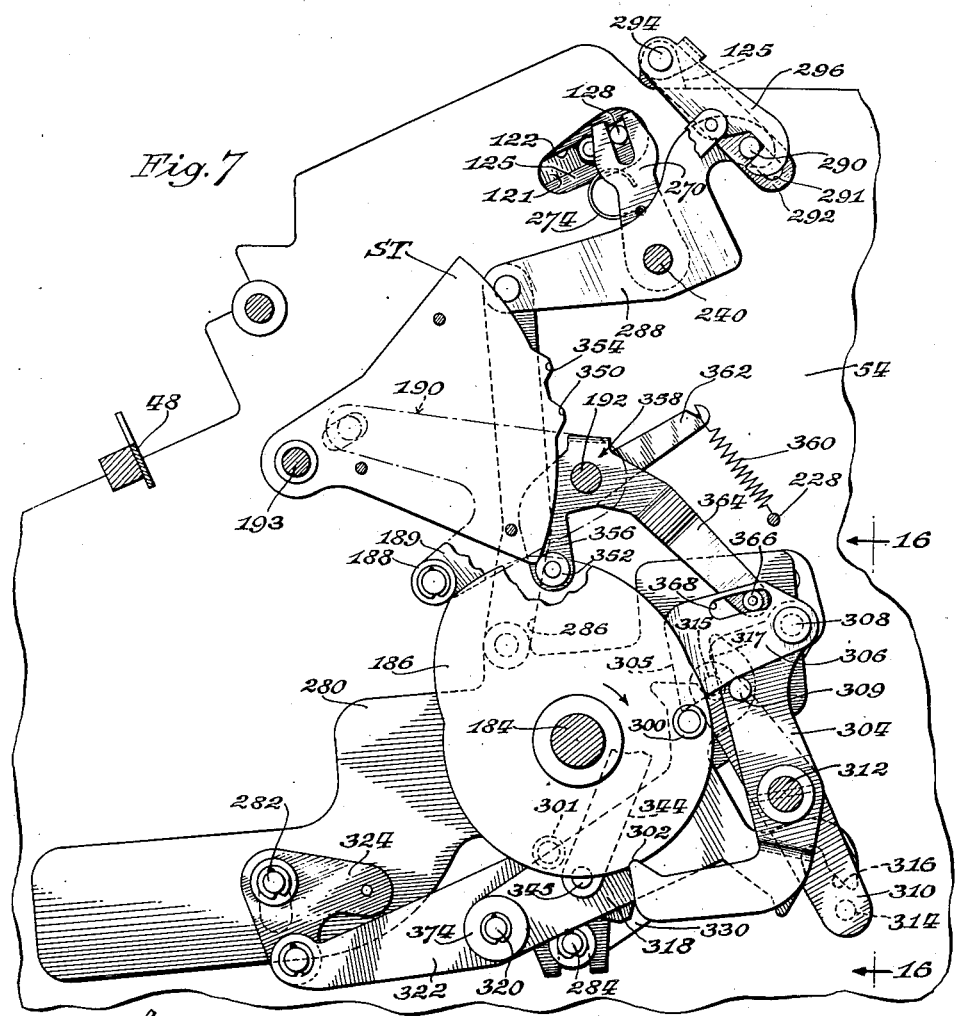
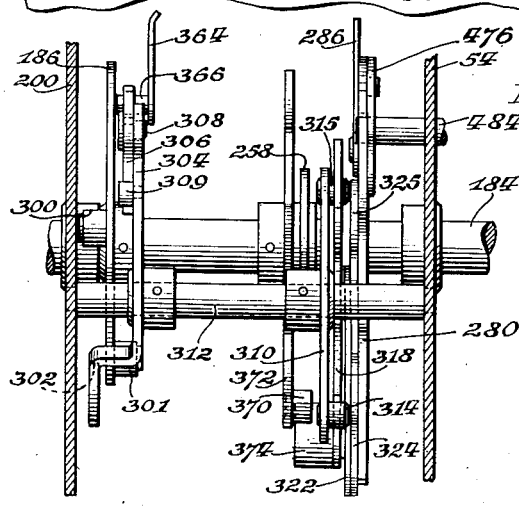
Inventor:
Thomas O. Mehan
By Williams, Bradbury & Hinkle
Attys.

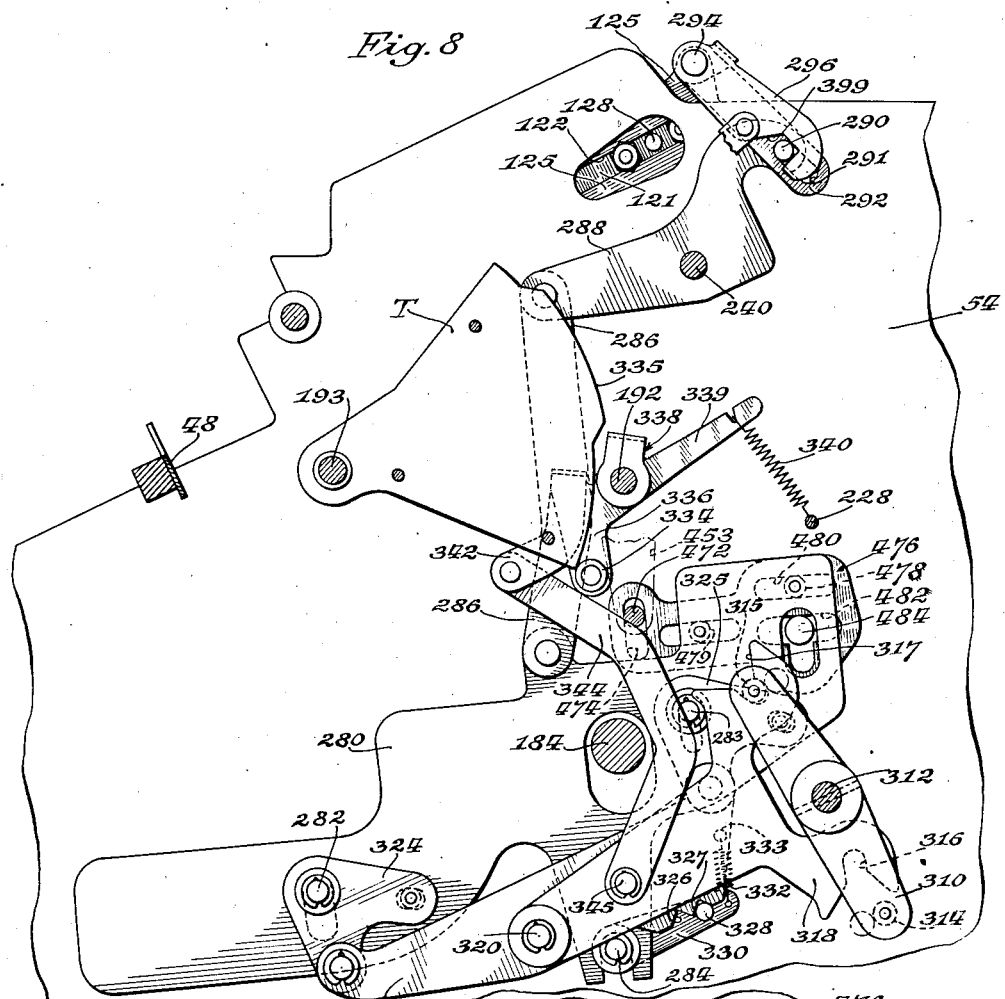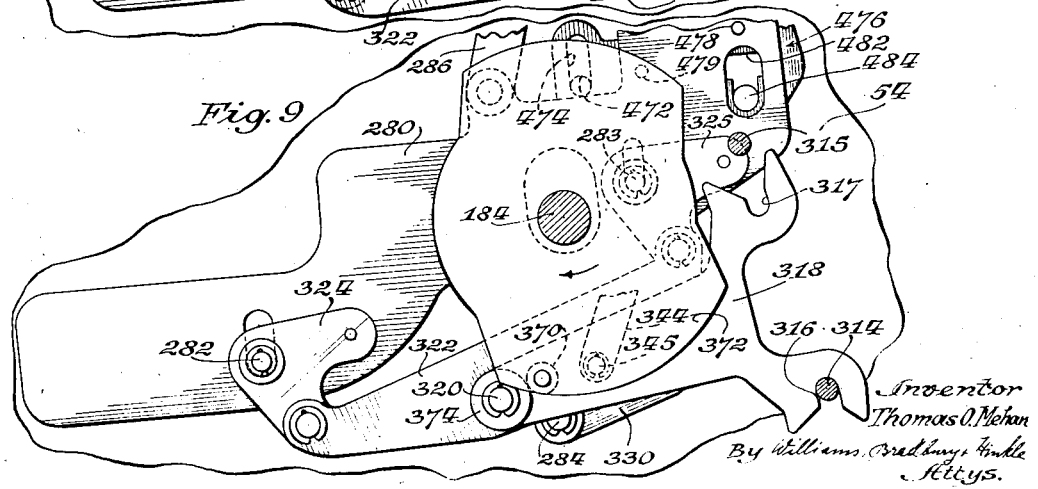

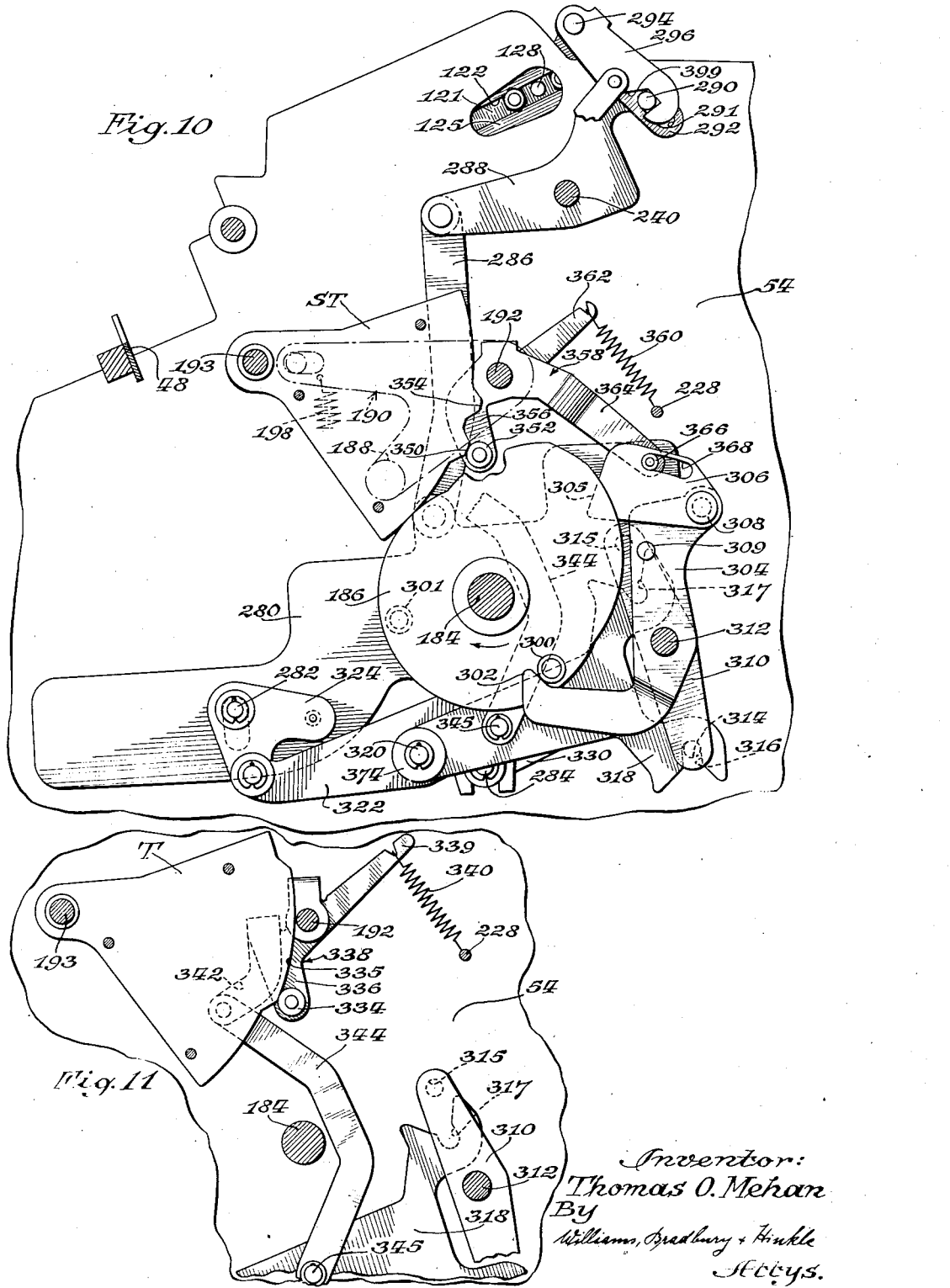

Oct. 10, 1944.　　　　T. O. MEHAN　　　　2,360,005
KEY SET CONTROL MECHANISM FOR CALCULATING MACHINES
Filed Dec. 30, 1940　　　11 Sheets-Sheet 9
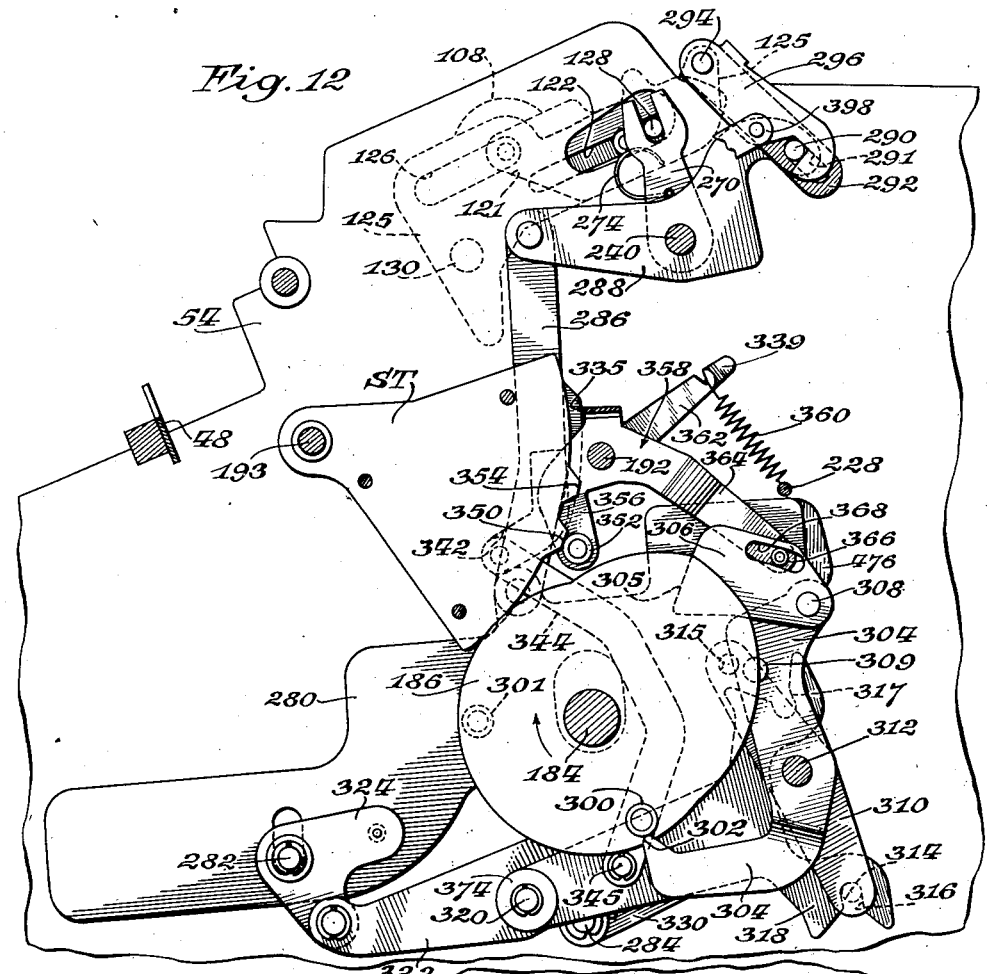
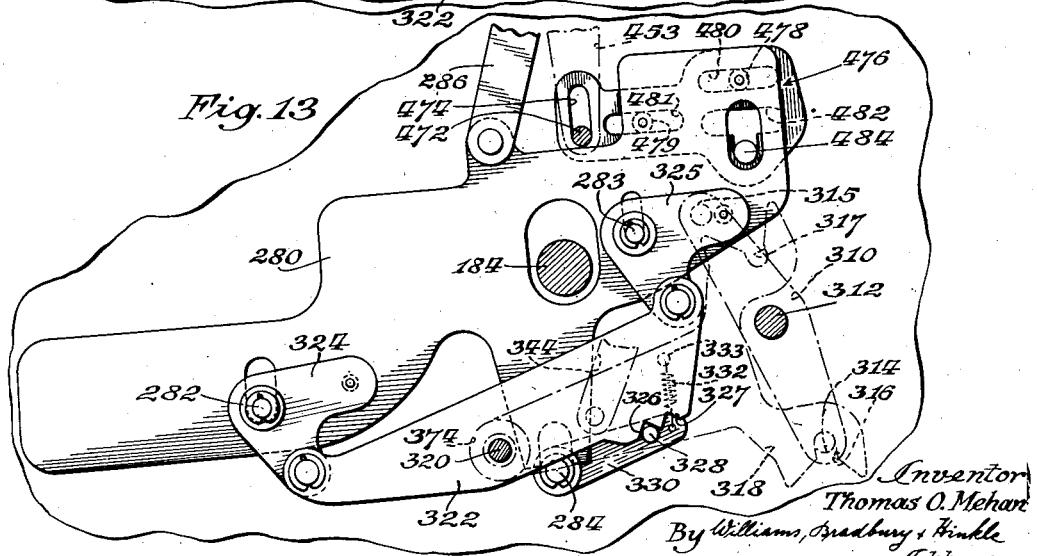
Inventor
Thomas O. Mehan
By Williams, Bradbury & Hinkle
Attys.

Oct. 10, 1944.  T. O. MEHAN  2,360,005
KEY SET CONTROL MECHANISM FOR CALCULATING MACHINES
Filed Dec. 30, 1940  11 Sheets-Sheet 10
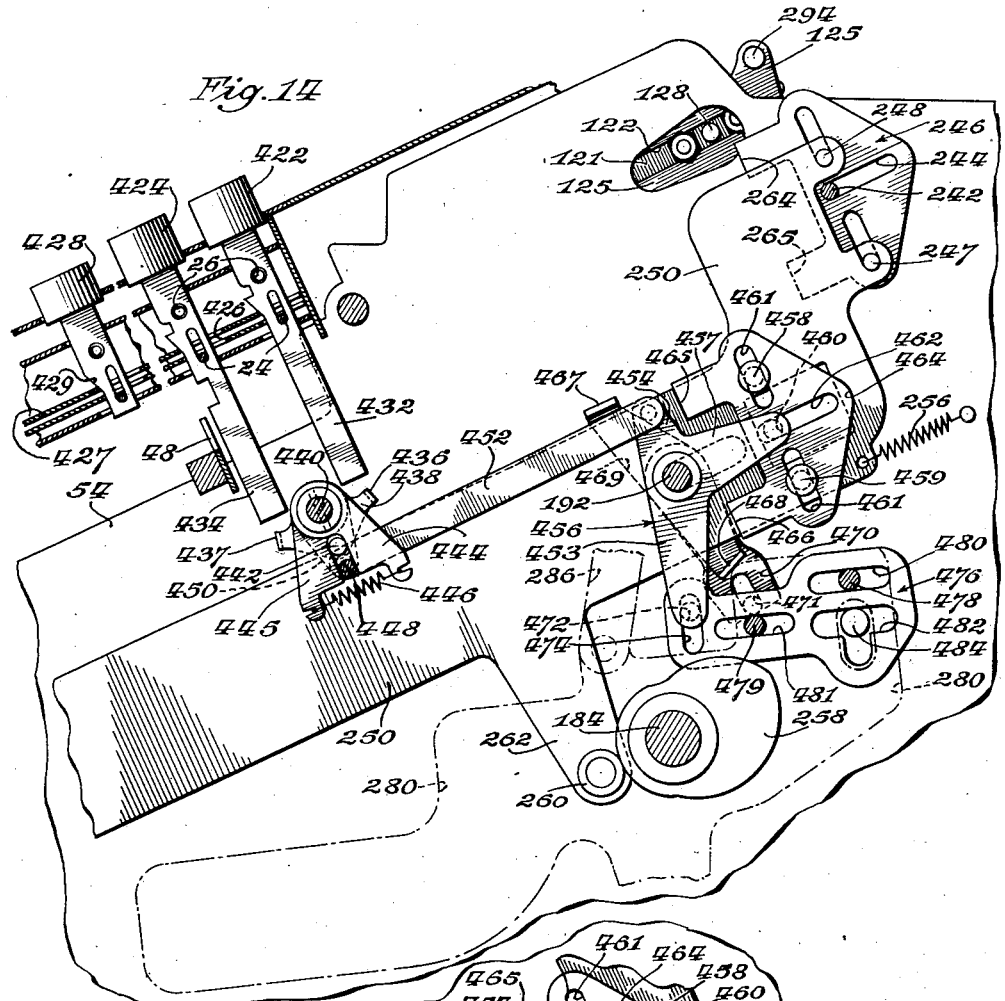
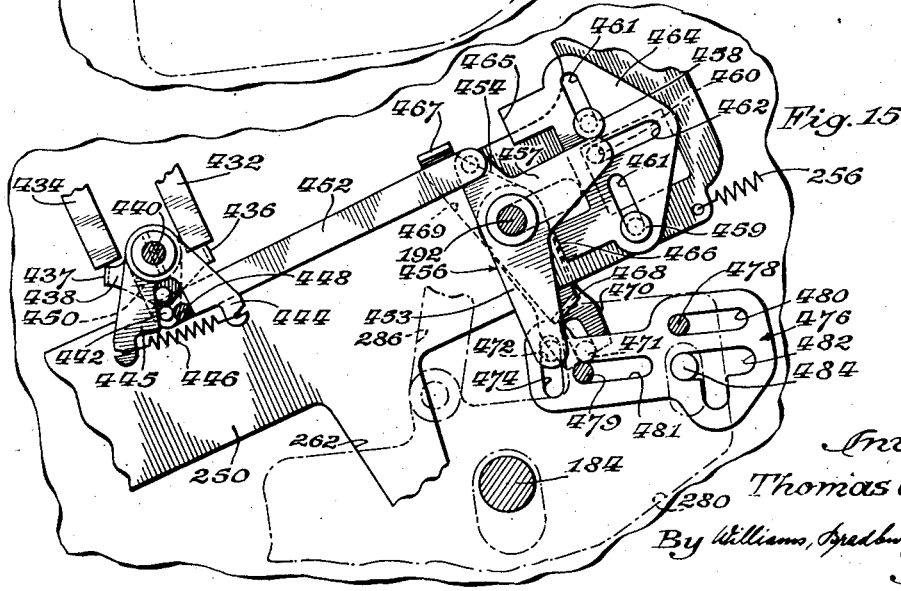
Inventor:
Thomas O. Mehan
By Williams, Bradbury & Hinkle
Attys.

Oct. 10, 1944. T. O. MEHAN 2,360,005

KEY SET CONTROL MECHANISM FOR CALCULATING MACHINES

Filed Dec. 30, 1940 11 Sheets-Sheet 11

Inventor:
Thomas O. Mehan
By Williams, Bradbury & Hinkle
Attys.

Patented Oct. 10, 1944

2,360,005

UNITED STATES PATENT OFFICE 2,360,005

KEY SET CONTROL MECHANISM FOR CALCULATING MACHINES

Thomas O. Mehan, Park Ridge, Ill., assignor to Victor Adding Machine Co., Chicago, Ill., a corporation of Illinois Application December 30, 1940, Serial No. 372,289

5 Claims. (Cl. 235—60)

My invention relates generally to calculating and adding machines, and more particularly to improvements in the means for controlling the operation of such machines.

It is an object of my invention to provide an improved control mechanism for adding and calculating machines, in which the character of the operating cycle of the machine is controlled by the position of a single member.

A further object is to provide an improved control mechanism for adding and calculating machines having a plurality of control keys and in which these keys determine the position of a differentially movable member and the latter, by its position, controls the character of the operating cycle.

A further object is to provide an improved total and subtotal cycle controlling mechanism for adding and calculating machines.

A further object is to provide an improved mechanism for controlling non-add, subtract, and accumulator selecting operations.

A further object is to provide a simplified and unified control mechanism for adding and calculating machines which is flexible in design for the control of various operating elements, which is simple in construction, which may be economically manufactured, and which will operate reliably.

Further objects will appear from the following description, reference being had to the accompanying drawings, in which:

Fig. 3 is a fragmentary sectional plan view of a calculating machine, showing particularly the control mechanism therefor;

Fig. 4 is a longitudinal sectional view, showing particularly the control mechanism for determining a subtracting cycle of operation, taken on the line 4—4 of Fig. 3;

Fig. 5 is a fragmentary longitudinal sectional view showing the control elements for determining a non-add operating cycle, taken on the line 5—5 of Fig. 3;

Fig. 6 is a view similar to Fig. 5, showing the parts in operated position;

Fig. 7 is a fragmentary vertical longitudinal sectional view, showing particularly the mechanism for controlling subtotal taking operations, taken on the line 7—7 of Fig. 3;

Fig. 8 is a longitudinal vertical sectional view taken on the line 8—8 of Fig. 3 and showing particularly the total taking control means;

Fig. 9 is a view similar to Fig. 8, showing the actuating cam for the total taking mechanism and associated parts, the cam and parts being shown in the positions assumed just prior to the completion of an operating cycle, and the section being taken on the line 9—9 of Fig. 3;

Fig. 10 is a fragmentary longitudinal sectional view showing the subtotal taking control mechanism, taken on the line 7—7 of Fig. 3, but showing the parts in actuated position;

Fig. 11 is a view similar to Fig. 8, but showing only some of the parts thereof, and showing these parts in actuated position;

Fig. 12 is a fragmentary vertical sectional view taken on the plane of the line 7—7 of Fig. 3 and showing the total and subtotal control mechanism in operated position;

Fig. 13 is a view similar to Fig. 12 with a number of parts removed, more clearly to reveal the remaining parts of the mechanism;

Fig. 14 is a fragmentary longitudinal vertical sectional view taken on the line 14—14 of Fig. 3 and showing particularly the accumulator selecting mechanism for the lower accumulators;

Fig. 15 is a view similar to Fig. 14, showing the parts in operated position;

Fig. 16 is a fragmentary transverse vertical sectional view taken on the line 16—16 of Fig. 7;

Fig. 18 is a fragmentary partly plan and partly sectional view of the master accumulator assembly; and, Fig. 19 is a diagram illustrating the relationship of of the high points or the control cam sectors.

In adding the calculating machines as customarily made in the past, it has been the practice to provide various mechanism trains between the control keys and the parts controlled thereby, and in most instances, all of these trains were more or less independent, with the possible exception of the total and subtotal operation controlling trains. Because of this general independence of the different control mechanisms, the trains of linkages required frequently were of necessity very complicated and in many respects wholly or partially duplicated. This type of control mechanism for determining the character of the operating cycle of the machine was a natural result of the process of development of the machines whereby, as the machines were improved to perform additional functions, appropriate control mechanisms were added to govern the machine in the performance of these added functions.

In accordance with the underlying principles of my invention, I have combined and unified the controls so that the character of the operating cycle to be performed by the machine is determined by the position of but a single element and the position of this element may readily be determined by the depression of control keys similar in their relationship to the positioned element to the relationship between the numeral keys and the actuator racks controlled thereby. By utilizing this principle of construction of the controls, the linkage trains for determining the character of the operating cycle of the machine are greatly simplified, a large number of parts being eliminated, and the danger of faulty operation due to wear is substantially reduced.

While the control mechanism of my invention may be applied in principle to various types of adding and calculating machines, it is herein disclosed as a part of an adding and listing machine having a plurality of accumulators and capable of performing subtracting operations, various features of the machine being more fully disclosed in my copending application Serial No. 359,271, filed October 1, 1940.

In order that the purposes, functions, and method of operation of the control mechanisms may be more readily comprehended, a brief description of the amount set up, actuating, accumulating, and printing mechanisms, will be given first.

*Amount set up, actuating, accumulating, and printing mechanism*

Figure 1:
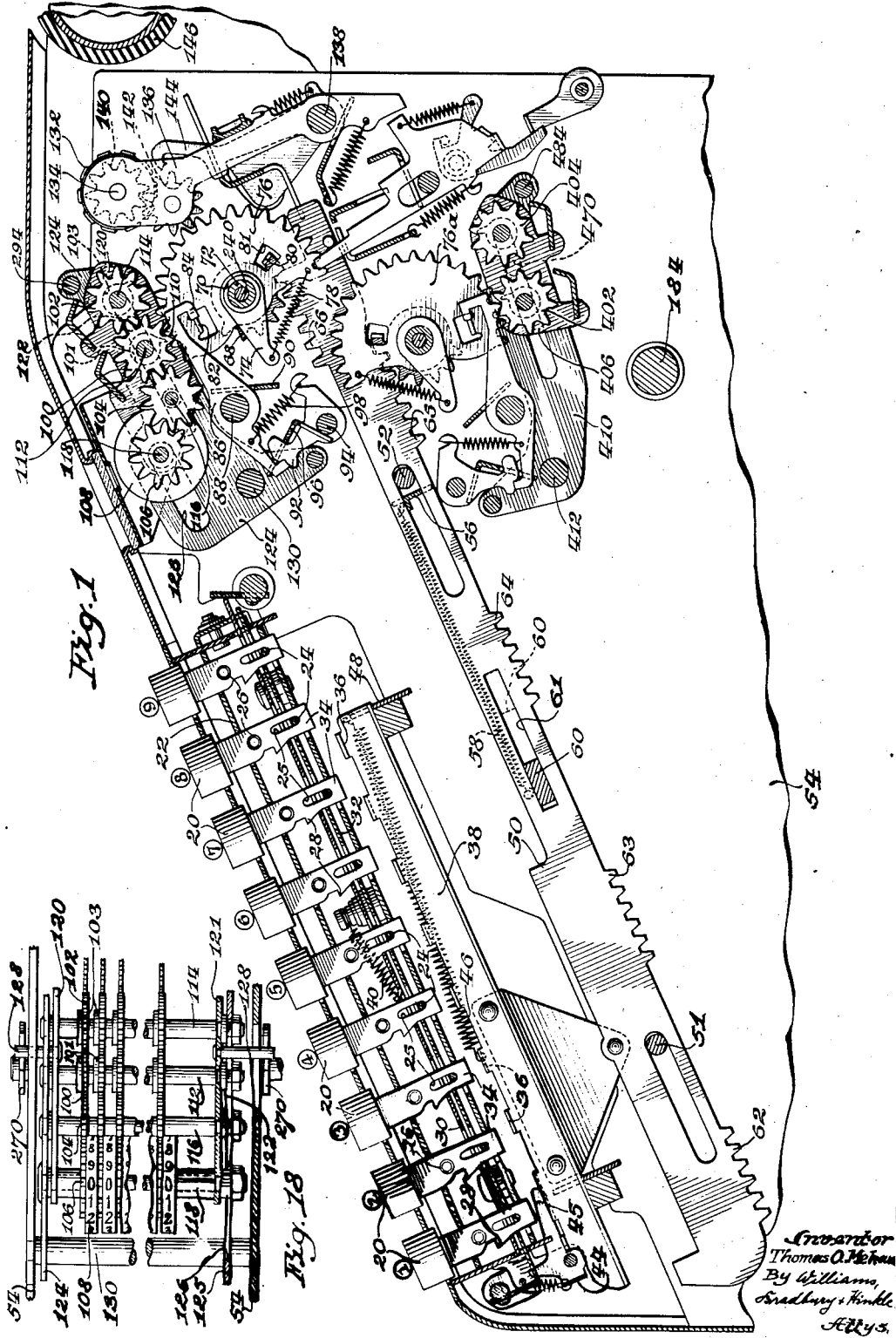
Fig. 1 is a fragmentary vertical longitudinal sectional view of a calculating machine taken on a plane adjacent a bank of numeral keys.

Referring to Fig. 1, the machine incorporates a plurality of numeral keys 20 mounted for vertical reciprocation in a key guide plate 22 and guided for longitudinal movement by rods 24 extending through suitable slots 25 formed in the key stems. The keys are held in the normal position shown in Fig. 1 by coil springs 26 which extend transversely of the machine through a transverse row of keys, the coil springs being adapted to be flexed upon the depression of a key and thus return the key to normal position when it is released, as will appear hereinafter. It will be understood that the ends of the springs 26 are anchored to the keyboard frame structure.

Each of the key stems is provided with a cam projection 28 of saw-tooth conformation cooperable progressively with a key latching slide 30 and a key locking slide 32. Each of the key stems has an end portion 34 which, when the key is in depressed position, lies in the path of one of a plurality of stops 36 formed upon a stepped actuator bar 38. When a key 20 is depressed, its projection 28 forces its latching slide 30 forwardly against the tension of a spring 40 so that when the key is fully depressed, the slide 30 will be pulled rearwardly and latch the key in depressed position. The cam projection 28 also engages the locking slide 32 and through the latter swings a bail 44 counterclockwise, the bail 44 carrying a hook arm 46 which engages a suitable stop on the stepped actuator bar 38. Thus, when the bail 44 is swung counterclockwise upon the complete depression of the key, the associated stepped actuator bar 38 will be released for rearward sliding movement under the influence of a tension spring 46, one end of which is attached to the stepped actuator bar and the other (rearward) end of which is attached to a guide comb 48. The stepped actuator bar 38 is rigidly connected to an accumulator rack 50 which is guided for longitudinal movement upon a pair of rigid transverse rods 51 and 52 suitably supported on the section frame plates 54 as well as by an angle comb 56 which maintains the rearward ends of the accumulator racks in properly spaced relation. Each of the accumulator racks is biased to move rearwardly by a tension spring 58, one end of which is suitably secured to the accumulator rack and the other end of which is anchored to the fixed comb 56.

A restoring bail 60 is guided for transverse sliding movement in the center section plates 54 and extends through slots 61 formed in the accumulator racks 50. It will be understood that during the initial portion of the operating cycle of the machine the restoring bail 60 will be moved rearwardly and upwardly in the direction of the slot 61 to the position shown in dotted lines in Fig. 1 so as to permit the rearward movement of the accumulator racks under the influence of their actuating springs 58 as limited by the engagement of one of the stops 36 on the stepped actuator bar 38 with the end 34 of the depressed key. From the foregoing, it will appear that the accumulator racks 50 will move differentially as determined by the amount set up by the keys 20 during the initial portion of the operating cycle, in a manner common in many types of adding machines.

Each of the accumulator racks is provided with a plurality of rack sections 62, 63, 64, 65, and 66 for the operation of accumulators. In order to avoid unnecessary duplication, only the master accumulator mechanism, which is operated through the rack section 66, and one of the lower accumulator mechanisms, which is operated by the rack section 65, are illustrated in Fig. 1, it being understood that the lower accumulator mechanisms, similar to that illustrated as operated by the rack section 65 may be provided for operation by the rack sections 62, 63, and 64.

The master accumulator mechanism comprises a segmental pinion 68 which is peened to a tubular hub 70 freely rotatable upon a hollow shaft 72. An arm 74 is also peened to the hub 70. A segmental gear 76 is freely rotatable upon the hub 70 between the arm 74 and the segmental pinion 68 and is resiliently biased to move clockwise with respect to the arm 74 by a tension spring 78. The extent of movement of the segmental gear 76 with respect to the arm 74 and the pinion 68 is limited by a lug 80 which extends sidewardly from the pinion 68 through a slot 81 formed in the segmental gear 76. The segmental gear 76 has a sidewardly projecting stop lug 82 cooperable with the hook shaped end 84 of a transfer pawl 86 freely pivoted upon a shaft 88 and maintained in alignment by a fixed comb plate 90. The transfer pawl 86 is normally held in the position in which it is shown in Fig. 1 by a locking dog 92 pivoted on a shaft 94 and maintained in alignment with the transfer pawl 86 by an angle comb plate 96, a tension spring 98 being provided to swing the locking dog 92 counterclockwise and the transfer pawl 86 counterclockwise, thereby to maintain the ends of these elements in engagement, as shown in Fig. 1. The master accumulator comprises a plurality of subtract accumulator pinions 100 which are in mesh with adding accumulator pinions 102, as well as with idler pinions 104, the latter being in mesh with pinions 106 secured to amount indicating wheels 108. Adjacent to and secured to the subtract pinions 100 and add pinions 102 are transfer cams 101 and 103 respectively, the high points of which are cooperable with a projection 110 formed on the transfer pawl 86. In the position shown, the master accumulator is in position for performing a subtract operation by virtue of the fact that the subtract pinion 100 is in mesh with the segmental gear 76. The pinions 100, 102, 104, and 106 are mounted for free rotation upon shafts 112, 114, 116, and 118 respectively, these shafts being suitably secured in a pair of inner frame plates 120, 121. The ends of the shafts 112, 114, and 116 extend through slots 122 formed in pivoted accumulator frame plates 124 and 125, while the ends of the shaft 118 project through slots 126 likewise formed in the pivoted frame plates 124, 125. The inner frame plates 120 and 121 each has an outwardly projecting pin 128 secured thereto, (Figs. 10, 12, and 14) these pins projecting through suitable slots formed in the section frame plates 54. The frame plates 124, 125 are mounted for pivotal movement upon a shaft 130.

From the foregoing, it will be clear that the four sets of intermeshing pinions forming the master accumulator, together with the inner frame plates 120, 121, upon which they are mounted, may be shifted forwardly and rearwardly, and that they may be swung upwardly about the pivot shaft 130 from the position in which these pinions are shown in Fig. 1.

In general, it may be stated, without referring to the particular means by which the results are obtained, that for an ordinary adding operation the adding pinions 102 are out of mesh with the segmental gear 76 during the rearward movement of the accumulator racks 50, and are brought into mesh with these gear segments 76 during the forward movement of the accumulator racks; that for subtract operations, the subtract pinions 100 are similarly out of mesh during the rearward stroke of the accumulator racks and brought into mesh with the gear segments 76 during the forward or return stroke of the accumulator racks; that during a subtotaling operation, the adding pinions 102 are held in engagement with their associated gear segments 76 during both the forward and the return strokes of the accumulator racks; that during a total taking operation, the accumulator wheels are maintained in mesh with their associated segmental gear 76 during the rearward movement of the accumulator racks 50 and disengaged from their segmental gears during the forward or return stroke of the accumulator racks, it being understood that when the total is positive, the adding wheels 102 will be in engagement with the segmental gear 76, while when the credit balance is to be taken, the subtract wheels 100 are engaged with the segmental gear 76; that for non-add operations, the accumulator wheels are not of course maintained in mesh with the segmental gears 76, either on the rearward or the return strokes of the accumulator racks 50.

The printing of the items added or subtracted, totals, subtotals, and credit balances, is accomplished by a plurality of type wheels 132, each of which is rotatably mounted upon a stud 134 riveted to an arm 136, the latter being pivoted on a shaft 138. Each of the type wheels has a pinion 140 secured to or formed integrally therewith, this pinion meshing with an intermediate idler pinion 142 which in turn meshes with its adjacent segmental gear 76. Thus, the type wheels 132 may be rotated to a position corresponding to the items added or subtracted or to the positions of the accumulator pinions in the taking of subtotals, totals, and credit balances. Each of the type wheel carrying arms 136 has associated therewith an aligner arm 144 which has a tooth for engagement between the teeth of its associated pinion 142 as the arm 136 is swung clockwise about its pivot shaft 138 to disengage the idler pinion 142 from the segmental gear 76. The type wheels are adapted to be swung into engagement with paper carried by a platen 146, a suitable inking ribbon being interposed between the type and the paper on the platen. The mechanism for operating the printing arms 136, for controlling their release so that they swing with hammer-like blows against the paper and platen, and the means for causing the tripping of the type wheels registering zero in an amount which ends in one or more zeroes, are not shown in detail in this application, but are more fully shown and described in my copending application Serial No. 372,290, filed December 30, 1940.

*Control keys and control cams positioned thereby*

Figure 2:
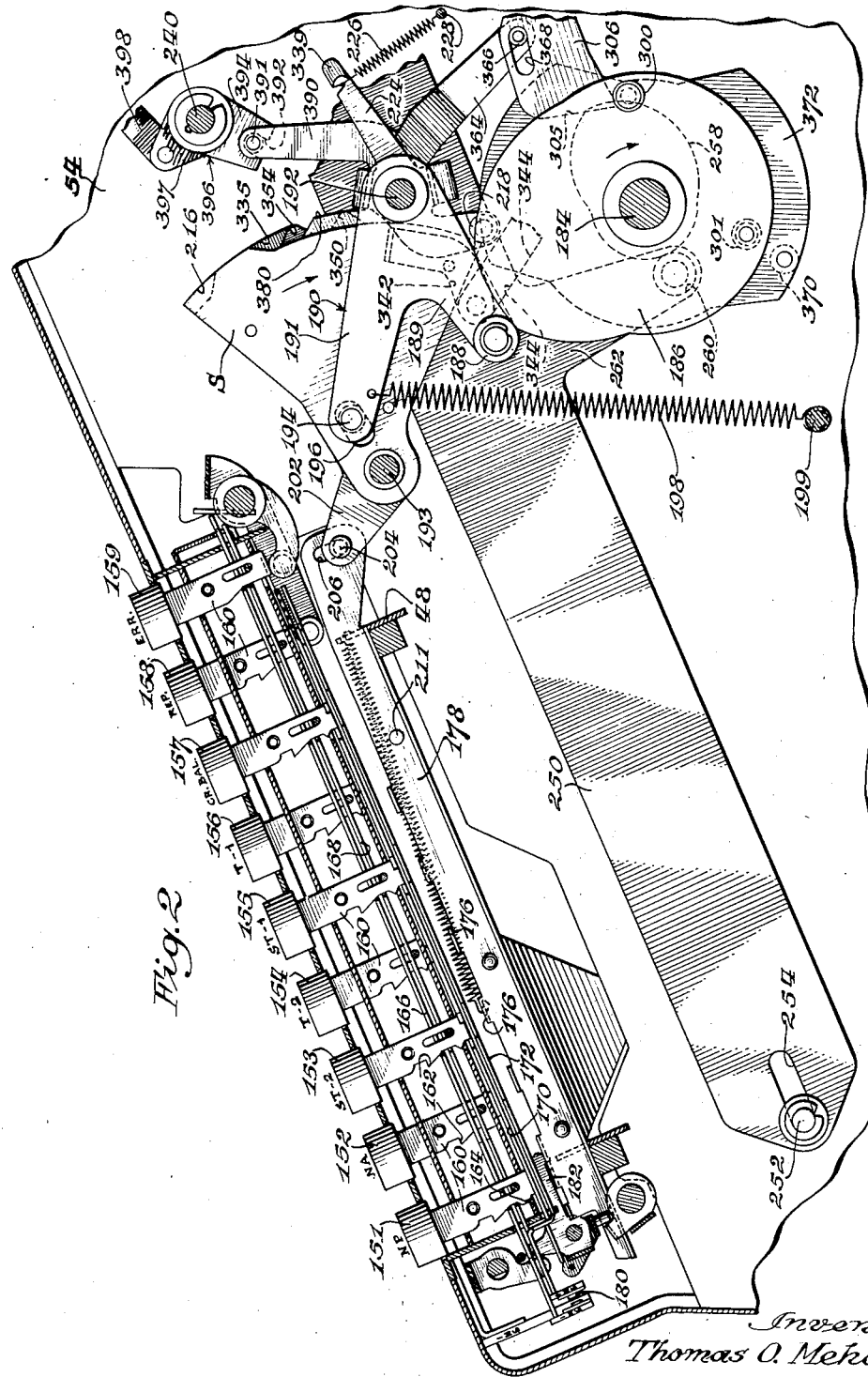
Fig. 2 is a view similar to Fig. 1 taken on a plane adjacent a bank of control keys and taken on the line 2—2 of Fig. 3.

Included in the keyboard of the machine is one bank of control keys 151 to 159 inclusive, as best shown in Fig. 2, which, by their depression, predetermine the character of the operating cycle to be performed by the machine. Each of these keys has a stem 160, each, except the error key 159, being provided with a pair of camming projections 162 and 164. The upper projections 162 are adapted to cooperate with sidewardly projecting lugs on a latching slide 166 and a locking slide 168, while the lower cam projections 164 are adapted to engage lugs or shoulders formed on slides 170 and 172. The lower extremities of the keys are adapted to be projected, when the keys are depressed, into the path of sidewardly projecting lugs 176 formed upon a stepped actuator bar 178 which is mounted for longitudinal sliding movement in the same manner as the stepped actuator bars 38 for the numeral keys. As more fully disclosed and claimed in my copending application Serial No. 359,271, filed October 1, 1940, the depression of one of the control keys 151 to 157 will cause closure of a switch 180 and the removal of a pair of latches 182 which engage suitable stops on the stepped actuator bar 178 and normally hold this bar in its forward position, as shown in Fig. 2.

Closure of the switch 180 results in initiating an operating cycle of the machine, causing the rotation of main shaft 184 (Fig. 2) in a clockwise direction. The shaft 184 has a plate cam 186 rigidly secured thereto, this cam having a follower roller 188 riding on the edge thereof. The roller 188 is carried by a stud projecting sidewardly from the lower arm 189 of a bell crank lever 190 which is pivoted upon a shaft 192. The upper arm 191 of the bell crank lever 190 carries a sidewardly projecting rod 194 which extends through slots 196 formed in a plurality of cam sectors designated S (subtract), N—P (non-print), N—A (non-add), S—T (subtotal), and T (total), respectively, pivoted on a shaft 193.

The bell crank lever 190 is biased for counter-clockwise movement to maintain its roller 188 in engagement with the edge of plate cam 186 by a tension spring 198, one end of which is secured to the arm 191 of the bell crank lever and the other end of which is anchored to a stud 199 secured in the outer frame plate 200 (Fig. 3).

The cam sector N—A has an upwardly and forwardly projecting arm 202 carrying a stud 204 which rides in a vertical slot 206 formed in the rearward end of the stepped actuator bar 178.

Thus, upon initiation of a cycle of operation by the closure of the switch 180, the rotation of the cam 186 in a clockwise direction (Fig. 2) will permit the spring 198 to swing the bell crank lever 190 counterclockwise, and thus the rod 194 attached to the bell crank arm 191 swings all of the cam sectors clockwise, and through the arm 202 and stud 204, draws the stepped actuator bar 178 rearwardly to an extent limited by the engagement of one of its lugs 176 with the extremity of the depressed key 151 to 157. It will be understood that the cam sectors thus have nine possible positions, as shown in the diagram Fig. 19, namely, (I) normal position, (II) non-print, (III) non-add, (IV) subtotal lower accumulator, (V) total lower accumulator, (VI) subtotal master accumulator, (VII) total master accumulator, (VIII) credit balance master accumulator, and (IX) subtract, and that these positions are respectively assumed by the cam sectors upon the depression of the keys 151 to 157 inclusive.

Figures 17, 19:
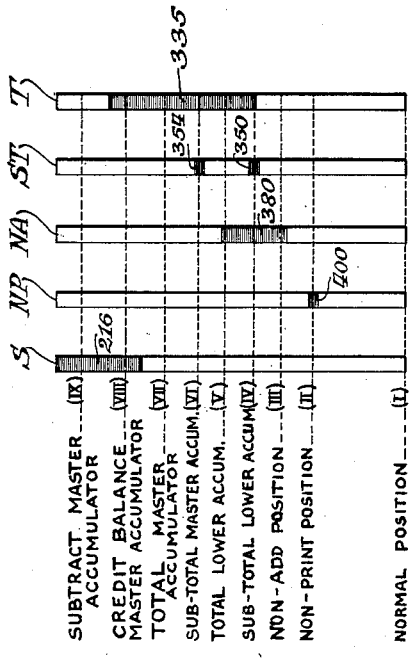
Fig. 17 is a chart showing the timing relationship between the operation of various mechanisms.

In the diagram Fig. 19, the horizontal dotted lines I to IX extending through the diagrammatically illustrated sector cams represent the positions of the follower rollers with respect to the cam sectors upon depression of the different control keys. The high points of the cam sectors are shown as heavily shaded in Fig. 19. Each of the cam sectors has a follower cooperable therewith (to be described in more detail hereinafter), through which the necessary linkages are actuated. It will be observed from Fig. 19 that in some positions of the cam sectors several of the followers will be displaced, while in other positions, only one of the followers may be displaced. However, to simplify the description of the mechanism and its operation, the linkages associated with each of the cam sectors will be individually described in the first instance and a description of the conjoint functions of the cam sectors deferred until their individual functions have been described.

*Subtract operation controlling mechanism*

Referring to Fig. 4, a subtract key 210 is provided. This key 210 has a stem 212, the lower end of which is adapted to engage a switch 214 and close the latter upon depression of the key. This switch 214 functions in the same manner as the switch 180 to initiate an operating cycle of the machine, through a mechanism and circuits more fully disclosed in my aforesaid application Serial No. 359,271. The subtract key stem does not engage any of the stop lugs on the stepped actuator bar 178, but is effective to release the latch 182 therefrom so that upon depression of the subtract key the stepped actuator bar is free to move rearwardly the full extent, such rearward movement being limited only by the engagement of a stud 211 (Fig. 2) on the stepped actuator bar 178 with the upwardly extending portion of the comb 48. When the stepped actuator bar 178 has thus moved rearwardly to the maximum extent, the high point 216 of the cam sector S will have moved to a position to engage and actuate a follower roller 218 carried on the forwardly and downwardly extending arm 220 of a bail lever 222, and swing the latter counterclockwise. The lever 222 has a rearwardly extending arm 224 to which a tension spring 226 is secured, the spring being suitably anchored on a rod 228 extending between the inner section plate 54 and the outer frame plate 200 (Fig. 3). The lever 222 forms part of a bail pivoted on a shaft 192, the bail portion 232 thereof being joined to an upwardly and rearwardly extending arm 234. The arm 234 carries a stud 235 which extends sidewardly into an open end slot 236 formed in the downwardly extending arm of a bell crank lever 238. This bell crank lever is pivoted upon a shaft 240, suitably mounted for rotation and which is coaxial with and extends through the tubular shaft 72. The rearwardly extending arm of the bell crank 238 has a stud 242 extending sidewardly into a slot 244 formed in an accumulator shift selector 246. The accumulator shift selector 246 is mounted for substantially vertical sliding movement upon a pair of studs 247, 248 carried at the rearward end of an accumulator shift slide 250. The slide 250 is mounted for longitudinal movement on a stud 252 and on the shaft 240, the stud 252 extending through an elongated slot 254 and the shaft 192 extending through a similarly elongated slot 255, these slots being formed in the accumulator shift slide 250. The accumulator shift slide 250 is normally held in its rearward position by a tension spring 256 anchored to the inner section plate 54 and is adapted to be moved forwardly by an accumulator shifting plate cam 258 non-rotatably secured to the main shaft 184. The cam 258 is engageable with a follower roller 260 carried by a depending arm 262 formed integrally with the accumulator shift slide 250.

The accumulator shift selector 246 has a pair of forwardly extending portions 264 and 265. An accumulator shift crank 266 has sidewardly extending lugs 268 and 269 which are adapted to be engaged respectively by the forwardly extending portions 264 and 265 of the accumulator shift selector 246. The accumulator shift crank 266 is secured to the shaft 240 (Fig. 1) and a pair of accumulator shift forks 270 are likewise rigidly secured to the shaft 240, the slots in these forks engaging the pins 128 (Fig. 18) which are rigid with the accumulator frame plates 120 and 121. Each of the accumulator shift forks 270 is biased to snap to either of its extreme positions by a substantially circular snap-over spring 274, one end of which is anchored in the adjacent inner section plate and the other end of which is attached to the fork 270.

When a subtract operation is to be performed, the subtract key 210 is depressed, and, as previously stated, the subtract cam sector will, during the initial portion of the operating cycle, be swung clockwise to a position causing its high point 216 to swing the lever 222, bail 232, and arm 234 counterclockwise against the tension of the spring 226. Such counterclockwise movement of the arm 234 will cause clockwise movement of the bell crank 238, with the result that the accumulator shift selector 246 will be moved downwardly from the position in which it is shown in full lines in Fig. 4 to the position in which it is shown in dot-dash lines in said figure. Thereafter, during an intermediate portion of the cycle of operation, the high point of the cam 258 will move the accumulator shift slide 250 forwardly, and such forward movement will cause the portion 265 of the accumulator shift selector 246 to engage the sidewardly projecting lug 269 of the accumulator shifting crank 266 and swing the latter clockwise to the position in which it is shown in Fig. 4, thereby shifting the accumulator carrying frame 120, 121 rearwardly so as to move the subtract pinions 100 in the position in which these parts are shown in Figs. 1 and 18.

It will be understood that during such shifting of the accumulator carrying frame plates 120 and 121, the pivoted accumulator frame plates 124, 125 will be swung counterclockwise from the position in which these parts are shown in Fig. 1 so that the subtract pinions 100 and the adding pinions 102 will lie above the teeth of the segmental gears 76. The means for causing such pivotal movement of the accumulator frame plates 124, 125 will be hereinafter described. With the accumulator carrying frame plates 120 and 121 in their upper positions (as shown in Fig. 4), such shifting of the adding pinions 102 to the position formerly occupied by the subtract pinions 100 is possible without disturbing the segmental gears 76.

It will be understood that when neither the subtract key nor the credit balance key is operated, the accumulator shift selector 246 will remain in the position in which it is shown in full lines in Fig. 4 so that upon the forward movement of the accumulator shift slide, the upper projection 264 of the accumulator shift selector will engage the upper lug 268 on the accumulator shift crank 266, and hence swing the accumulator shift forks 270 forwardly to a position in which the adding wheel pinions 102 will lie in the positions in which the subtract pinions 100 are shown in Fig. 1.

*Sequence of operations shown in Fig. 17*

Fig. 17 is a timing chart showing the sequence in which the various parts of the machine operate. By referring to this chart, the particular angular phase of the main shaft at which the different operations commence and are completed may readily be determined. This timing chart is useful in correlating the operations of the various mechanisms, and will be referred to from time to time hereinafter for this purpose.

The portion of the chart showing the movement of the accumulator racks is not particularly relevant to the present invention, but has more particular pertinence to the structure shown in the co-pending joint application, Serial No. 433,608 filed March 6, 1942, by myself and Hunter E. Hooe.

*Accumulator engagement controlling mechanism*

It will be understood that to effect adding, sub-totaling, and totaling operations, as well as in performing subtracting and credit balance taking operations, it is necessary to cause the engagement of either the adding pinions 102 or the subtract pinions 100 with the segmental gears 76 and the disengagement of these pinions therefrom at predetermined phases of the operating cycle of the machine. The mechanism for accomplishing these results is best shown in Figs. 7 to 13 and 16.

The motive power for swinging the accumulators (both the master accumulator and the lower accumulators) into engagement with their respective segmental gears, such as the gears 76, is derived from the vertical reciprocation of an accumulator engaging beam 280 which is guided for reciprocatory movement on studs 282, 283, and 284, which are secured in the section plate 54. The master accumulator is brought into engagement with its actuating segmental gears 76 and disengaged therefrom through a mechanism including a link 286, the lower end of which is pivoted to the accumulator engaging beam 280 and the upper end of which is pivoted to the forward end of a lever 288. The lever 288 is pivoted on a shaft 240 and its rearward arm carries a stud 290 which projects sidewardly through a slot 291 formed in an arm 292 pivoted to a rod 294 which is secured to the rearward ends of the pivoted accumulator frame plates 124 and 125 (Fig. 1).

The stud 290 is normally held in the upper end of the slot 291, in the position in which it is shown in Figs. 5, 7, 8, and 12, by a non-add latch 296 which is likewise pivoted on the rod 294. From the foregoing, it will be apparent that when the accumulator engaging beam 280 is moved upwardly, the master accumulator will be swung downwardly to cause either its add or subtract pinions to be brought into meshing engagement with the segmental gears 76, while, upon downward movement of the beam, the adding or subtracting pinions are disengaged from the segmental gears 76.

The means for causing upward and downward movement of the accumulator engaging beam comprises the cam 186 which is fixed to the main shaft 184 and carries a pair of sidewardly projecting studs 300, 301 which are adapted to engage respectively the pointed end 302 of a lever 304 and the camming surface 305 of the subtotal plate 306. The subtotal plate 306 is pivoted on a stud 308 carried by the upper end of lever 304. Rigidly secured to the lever 304 is a rocker 310, these parts preferably being rigidly secured to a shaft 312. The rocker 310 has sidewardly projecting studs 314, 315 adjacent its ends which are adapted for engagement in notches 316, 317, respectively (Fig. 9), of a forked accumulator engaging selector 318, the latter being pivoted on a stud 320 carried by an accumulator engaging link 322.

The ends of the accumulator engaging link 322 are pivoted respectively to the downwardly extending arms of bell crank levers 324 and 325, the bell crank levers being pivoted upon the studs 282 and 283 respectively.

The accumulator engaging link has a pair of notches 326, 327 in its lower rearward edge which are adapted to be engaged by a sidewardly extending stud 328 of a detent arm 330 which is pivoted on the stud 284 and held in one or the other of the notches 326, 327 by a tension spring 332. The upper end of the spring 332 is anchored to a stud 333 carried by the section plate 54. The forked accumulator engaging selector 318 is adapted to be swung clockwise from the position in which it is shown in Fig. 8 to the position in which it is shown in Fig. 9 by the engagement of the high point 335 of the cam sector T with a follower roller 334 carried on the depending arm 336 of a three-arm lever 338. The upwardly and rearwardly extending arm 339 of the three-arm lever 338 has a tension spring 340 attached thereto for normally urging the three-arm lever 338 in a clockwise direction to maintain the follower roller 334 in engagement with the edge of the cam sector T. The three-arm lever 338 has a forwardly extending arm 342, to which is pivoted a link 344, the other end of the link 344 being pivoted to a stud 345 carried by the forked accumulator engaging selector 318.

From the foregoing, it will appear that when the three-arm lever 338 is swung counterclockwise by the high point of the cam sector T, as shown in Fig. 11, the forked accumulator engaging selector 318 will be swung clockwise through the link 344 to cause its notch 316 to engage the lower stud 314 of the rocker arm 310 and thereby cam the rocker arm clockwise from the position in which it is shown in Fig. 7 to the position in which it is shown in Fig. 10. Since the lever 304 is rigidly secured to the rocker 310, the former will swing clockwise with the rocker to bring its pointed end portion 302 into the path of the stud 300.

Just after the lever 304 has thus been swung clockwise to the position in which it is shown in Fig. 10, the stud 300 will engage the pointed end 302 of the lever 304 and swing the latter counterclockwise to the position in which it is shown in Figs. 12 and 13. Such counterclockwise movement will cause the forked accumulator engaging selector 318 to be moved rearwardly, due to the engagement of its notch 316 with the stud 314, and thereby move the accumulator engaging link 322 rearwardly, with the result that the bell crank levers 324 and 325 will be swung counterclockwise to cause the accumulator engaging beam to be elevated and thereby to bring the accumulator pinions into engagement with the actuating segmental gears 76 as shown in Fig. 12. The parts described will be held in these positions by the detent 328, 330 engaging in the notch 326 of the accumulator engaging link 322, as indicated in Fig. 13.

Upon further rotation of the main shaft, the stud 301 will engage the camming surface 305 of the subtotal plate 306 and push the latter rearwardly, since it is held from counterclockwise movement on its pivot 308 by a stop 309 on the lever 304. As a result, the lever 304 will be swung clockwise, and, since the rocker 310 will move with the lever 304, its pin 314, in engagement with the notch 316 of the forked accumulator engaging selector 318, will cause the accumulator engaging link 322 to be moved forwardly, thereby to swing the bell cranks 324, 325 clockwise and lower the accumulator engaging beam 280. Lowering of the accumulator engaging beam 280 results in disengagement of the accumulator pinions from their respective segmental gears 76, and the parts are held in this position by engagement of the stud 328 of the detent 330 in the notch 327 of the link 322.

*Subtotal taking mechanism*

As is well known, the taking of a subtotal requires merely that the accumulators be maintained in mesh during both the forward and return strokes of the accumulator racks. Taking of subtotals is, of course, controlled by the control keys 153 and 155, depression of the key 153 resulting in a high point 350 of the cam sector S—T being positioned to engage a follower roller 352 (Fig. 7), while depression of the key 155 results in a high point 354 of the cam sector S—T being in position to engage the follower roller 352. The follower roller 352 is mounted on the depending arm 356 of a three-arm lever 358. The three-arm lever 358 is biased for clockwise movement to hold its roller 352 in engagement with the edge of the cam sector S—T by a spring 360, one end of which is anchored to the rod 228 and the other end of which is attached to a rearwardly and upwardly extending arm 362 of the lever 358. The lever 358 has a downwardly and rearwardly extending arm 364 which, at its lower extremity, has a stud 366 projecting sidewardly into an elongated slot 368 formed in the subtotal plate 306.

*Subtotal taking operation*

Assuming that the machine is in proper condition for the taking of a subtotal, when the subtotal cam sector S—T is moved to a position such that one of its high points 350 or 354 engages the follower roller 352, the subtotal plate 306 will be raised to the position in which it is shown in Fig. 10 and its cam surface 305 will thus lie outside of the path of the stud 301. Thus, the accumulators will not be disengaged from their segmental gears 76 after the actuator racks have completed their rearward strokes, but instead, will remain in mesh with their segmental gears during the forward (or return) stroke of the accumulator racks. The accumulators must, however, be disengaged from their segmental gears prior to the completion of the forward strokes of the accumulator racks, and this is accomplished by the engagement of a stud 370 extending sidewardly from a plate cam 372 (Figs. 2 and 9). Just prior to the completion of the operating cycle, this stud 370 engages a roller 374 carried on the stud 320, and through such engagement, moves the accumulator engaging link 322 forwardly, thereby to lower the accumulator engaging beam 280, with resulting disengagement of the accumulator pinions from their segmental gears 76. In Fig. 9, this engagement of the studs 370 with the roller 374 is indicated, the cam 372 being shown in the position it assumes about 5° prior to the completion of the cycle.

To review the operation of taking a subtotal, the operator presses the key 153 if a subtotal is desired in a lower accumulator, or presses the key 155 if a subtotal is desired in the master accumulator. Depression of one of these keys results in the initiation of an operating cycle of the machine, whereupon the stepped actuator bar 178 is moved rearwardly a distance sufficient to cause the subtotal cam sector S—T to be moved to the position indicated in Fig. 10, with its high point 350 engaging the follower 352, providing the key 153 has been depressed. (If the key 155 has been depressed, the cam sector S—T will be moved to a position in which its high point 354 engages the follower 352.) Such engagement of one of the high points 350 or 354 of the cam sector S—T with its follower results in swinging the three-arm lever 358 counterclockwise, as previously described, and raising the subtotal plate 306 to the position shown in Fig. 10, where its cam surface is not engageable by the stud 301.

It will be apparent from the diagram Fig. 19 that whenever either of the high points 350 or 354 of the cam sector S—T are in engagement with their associated follower, the high point 335 of the cam sector T is likewise in engagement with its follower 334. Due to this fact, shortly after the initiation of the subtotaling cycle, the forked accumulator engaging selector 318 is swung downwardly to cause its lower notch 316 to engage the stud 314 of the rocker 310, as shown in Fig. 10. Thereafter, the stud 300 engages the pointed end 302 of the lever 304, and, through the train of mechanism previously described, elevates the accumulator engaging member 280 to cause engagement of the accumulators with their associated segmental gears 76.

After these operations have taken place, the accumulator racks 50 are permitted to move rearwardly under the action of their associated tension springs 58 until such motion is limited by the engagement of the transfer cams 101, 103 with the zero stop face of the cam projections 110 on the transfer pawls 86. During such rearward movement of the accumulator racks, the idler pinions 142 are in mesh with the segmental gears 76 so that the type wheels 132 will be rotated amounts corresponding to the displacement of their associated accumulator pinions. After the accumulator racks 50 have completed their rearward motion, the type wheels are operated to imprint the subtotal upon the paper record strip (with suitable subtotal designating indicia, not herein disclosed), and after the type have made their printing impression, their idler pinions 142 are reengaged with the segmental gears 76. Following this, the accumulator racks 50 are moved forwardly by the restoring bail 60 to their normal positions. After the accumulator racks have been thus restored to their normal positions, the stud 370 engages the roller 374 to swing the accumulator engaging link 366 forwardly, as previously described, thereby to lower the accumulator engaging beam 280 and disengage the accumulator pinions from the segmental gears 76.

*Total taking operation*

Assuming the machine is in proper condition for the taking of a total, when either the key 154 or the key 156 is depressed for the taking of a total in any one of the lower accumulators or in the master accumulator respectively, the subtotal cam sector S—T is shifted to the position indicated by (V) or (VII) in Fig. 19, in which position, it will be apparent from this figure, the follower 352 will be positioned intermediate the high points 350 and 354, or beyond the high point 354. As a result, the subtotal plate 306 will be in a position (Fig. 7) where its camming surface 305 may be engaged by the stud 301. However, the three-arm lever 338 will be in the position in which it is shown in Fig. 11, and in moving to this position, will have caused engagement of the lower notch 316 of the forked accumulator engagement selector 318 with the stud 314. (In Fig. 11 the cam sector T is shown in the position it assumes during the taking of a subtotal on a lower accumulator, but the other parts in this figure are in the positions which they assume upon a total taking operation for either the lower or the master accumulators.)

The total taking operation will follow in the sequence above described with reference to taking a subtotal except that the accumulator pinions are disengaged from the segmental gears 76 before the accumulator racks 50 commence their return or forward strokes. The disengagement of the accumulators is effected by engagement of the stud 301 with the cam surface 305 of the subtotal plate 306. This results in rocking the lever 304 clockwise and causing the forked accumulator engaging selector 318 to move forwardly, thereby swinging the accumulator engaging link 322 forwardly to lower the accumulator engaging beam 280 and thus to disengage the accumulator pinions. During the taking of a total, the numeral type wheels are operated in the same way as during the taking of a subtotal.

*Non-add operations*

When the non-add key 152 is depressed, the cam sectors are, upon operation of the machine, moved to the position (III) indicated in Fig. 19, and the high point 380 (Fig. 5) of the non-add cam sector N—A will engage its follower roller 382 which is carried by the depending arm 383 of a three-arm lever 384 pivoted on the shaft 192. The follower roller 382 is held in engagement with the edge of the cam sector N—A by a tension spring 386, one end of which is anchored to the rod 228 and the other end of which is attached to the upwardly and rearwardly extending arm 388 of the three-arm lever 384. The third arm 390 of the lever 384 has a sidewardly extending stud 391 at its upper end which engages in a notch 392 formed in the depending arm 394 of a bell crank 396 pivoted on the shaft 240. The other arm 397 of the bell crank 396 is connected by a link 398 with the previously mentioned latch 296. The latch 296, as previously described, has a notch 399 engaging the stud 290.

Thus, when the non-add key is depressed, the non-add cam sector N—A will be moved to the position in which it is shown in Fig. 6, and, through the three-arm lever 384, bell crank 396, and link 398, swing the latch 296 counterclockwise to break the driving connection between the lever 288 and the slotted link 292. As a result, the raising and lowering of the accumulator engaging beam 280 will not cause the engagement of the accumulator pinions with their segmental gears 76, since the oscillation of the lever 288 will merely result in movement of its stud 290 in the slot 291 of the link 292, and the accumulator pinions will therefore remain out of mesh. Thus, amounts may be listed without adding them to the accumulator.

*Normal adding operation*

In performing a normal operation of addition, the numeral keys 20 are depressed in the usual manner to set up the desired amount, and an operating cycle initiated by the usual motor control bar (shown in my aforesaid application Serial No. 359,271). Under these circumstances, none of the control keys 151 to 159 will be depressed, and the cam sectors will remain in the positions in which they are shown in Fig. 2 throughout the operating cycle. The forked accumulator engaging selector 318 will be in the position in which it is shown in Fig. 8 with its upper notch 317 in engagement with the stud 315 of the rocker 310. When the parts are in the position shown in Fig. 8, the lever 304 will be in the position in which it is shown in Fig. 7 so that the stud 300 will not engage the pointed end portion 302 of the lever 304. The accumulator engaging beam 280 will therefore remain in its lower position (and the accumulators out of engagement) until the stud 301 strikes the cam surface 305 of the subtotal plate 306, which will occur after the accumulator racks 50 have completed their rearward travel. The engagement of the stud 301 with the subtotal plate 306 will swing the lever 304 and rocker 310 clockwise, and thereby move the forked accumulator engaging selector 318 and the accumulator engaging link 322 rearwardly to elevate the accumulator engaging beam 280 and lower the accumulator pinions into engagement with the segmental gears 76. Just prior to the completion of the operating cycle, the stud 370 will engage the roller 374 (Fig. 9) and move the accumulator engaging link 322 forwardly and thereby move the beam 280 to its lower position, thus disengaging the accumulator pinions from their segmental gears 76 with all parts of the accumulator engaging mechanism restored to normal position.

Non-print operation

When the non-print key 151 is depressed, the non-print cam sector N—P is moved to a position such that its high point 400 (Figs. 4 and 19) is positioned for engagement with its follower (not shown, but similar to the followers 218, 382, and 352, previously described) for the operation of a suitable means to prevent the type carrying arms 136 from swinging rearwardly to make a printing impression.

Credit balance, master accumulator

When the operator desires to take a total and clear the master accumulator, but notices from the indicator wheels 108 that there has been an overdraft, or that a negative total is present therein, he will operate the credit balance key 157 (Fig. 2) to effect the taking of such credit balance. Instead of making it necessary that the operator observe from the indicator wheels 108 whether or not a credit balance is present in the master accumulator, some other form of indicator, as is well known in the art, may be provided to apprise the operator of the presence of the negative or credit balance. This indicating mechanism may be associated with the fugitive one inserting mechanism, which, for the sake of simplicity, is not disclosed herein. Such negative total indicating mechanism may also be employed in any well known manner to lock the subtotal and total keys 155 and 156 against depression whenever a credit balance is present in the master accumulator and to lock the credit balance key 157 against depression whenever a positive total is present in the master accumulator.

When the credit balance control key 157 is depressed, the cam sectors will be moved to positions indicated by the dotted line VIII of Fig. 19, with the high point 216 of the cam sector S engaging its follower 218 and the high point 335 of the cam sector T engaging its follower 334. The cam sector S will therefore condition the accumulator shift selector 246 to move the master accumulator to subtract position as soon as the accumulator shift slide 250 is moved in a forward direction. At the same time, the engagement of the follower 334 with the high point 335 of the cam sector T will cause engagement and disengagement of the subtract pinions 100 (Fig. 1) with the segmental gears 76 in the same sequence and at the same times during the operating cycle as was above described with reference to a total taking operation, namely, causing such engagement during the rearward movement of the accumulator racks 50 and disengaging the accumulator pinions from the actuating segmental gears 76 during the forward movement of the accumulator racks 50.

Lower accumulators

In the foregoing description, reference has been made to lower accumulators without specifically describing them or disclosing the method by which they operate. For purposes of illustration, only one pair of lower accumulators is indicated in Fig. 1, these being the accumulators formed by pinions 402 and 404 which are suitably mounted upon a frame 406 which is slidable in slots formed in arms 410 pivoted upon a rod 412. The frame 406 corresponds to that formed by the frame plates 120 and 121 of the master accumulator, while the arms 410 correspond to the arms 124, 125 of the rocking frame for the master accumulator. The pinions 402 and 404 are adapted to be rotated by segmental gears 76a which are identical in construction and operation with the segmental gears 76 previously described, these gears being actuated, however, from the rack portion 65 of the accumulator rack 50.

A determination of which, if any, of the lower accumulators 402, 404 should be brought into engagement with the segmental gears 76a is controlled by a pair of keys 422 and 424, shown in Fig. 14. These keys are adapted to be latched in depressed position by a slide 426 and can be released only by depression of a release key 428 which has a cam surface 429 engageable with the latching slide 426 as well as locking slide 427 so as to move both of these slides forwardly and thus release whichever of the keys 422 or 424 is depressed.

The key 422 has a stem 432, while the key 424 has a stem 434. The lower ends of the stems 432 and 434 are adapted to engage sidewardly extending lugs 436 and 437, respectively, of a lever 438 which is non-rotatably secured to a shaft 440, the latter being mounted for rotation in the section plates 54 and 200. The lever 438 has a sidewardly extending pin 442 which is located between a pair of arms 444 and 445 which are freely pivoted on the rod 440, their lower ends having a tension spring 446 attached thereto to draw these arms into engagement with the pin 442 as well as into engagement with a stud 448 which is fixed to the outer section plate 200 (Fig. 3).

An arm 450 is pinned to the shaft 440 and is pivotally connected to the forward end of a link 452. The rearward end of the link 452 is pivotally connected to one arm 454 of a three-arm lever 456 pivotally mounted on the shaft 192. A rearwardly projecting arm 457 of the three-arm lever 456 has a sidewardly extending stud 460 which projects into an elongated slot 462 formed in a lower accumulator shift selector 464. The selector 464 is mounted for vertical reciprocatory movement relative to the accumulator shift slide 250 by a pair of studs 458, 459 which project through elongated slots 461, formed in the selector 464.

The selector 464 has forwardly extending lugs 465 and 466 engageable, respectively, with sidewardly projecting lugs 467 and 468 of an accumulator shift crank 469, the latter being pivoted on the shaft 192. A pair of forked accumulator shift arms 470 are mounted upon the hub (or sleeve) of the accumulator shift crank 469 so as to be moved therewith. The forked arms 470 respectively engage studs 471 projecting sidewardly from the accumulator frame plates 406 (Fig. 1) and form the connection by which the accumulators are shifted to cause the selective engagement of either the accumulator pinions 402 or the accumulator pinions 404 with the segmental gears 76a.

The third arm 453 of the three-arm lever 456 has a stud 472 which projects through an elongated vertical slot 474 formed in a slotted connector plate 476 which is mounted for forward and rearward sliding movement on studs 478 and 479, the latter projecting sidewardly from the accumulator engaging beam 280. The studs 478 and 479 project through elongated horizontal slots 480 and 481 in the slotted plate 476. The plate 476 is also provided with a T-shaped slot 482, through which projects the end of a rod 484 which is secured to the ends of the rocking accumulator frame plates 410.

When the plate 476 is in the position in which it is shown in Fig. 14, the plate 476 is free to move upwardly and downwardly with the accumulator beam 280 without causing the engagement of either the accumulator 402 or the accumulator 404 with the segmental gears 76a. However, when one of the keys 422 or 424 is operated, as for example, when the key 422 is depressed, as indicated in Fig. 15, the link 452 is pulled forwardly, thereby causing the slotted plate 476 to be moved rearwardly to provide a driving connection between the beam 280 and the rod 484. When the slotted plate 476 is moved rearwardly, the forwardly extending top portion of the T-shaped slot 482 engages the rod 484 so that when the beam 280 moves upwardly, the plate 476 will raise the rod 484 and, as will be apparent from Fig. 1, cause engagement of the accumulator pinions 402 with the segmental gears 76a.

On the other hand, if the key 424 is depressed, the lever 438 and hence the arm 450 will be swung counterclockwise from normal position to move the link 452 rearwardly and swing the three-arm lever 456 clockwise, thereby lowering the accumulator shift selector 464 to a position in which its lower lug 466 will engage the lug 468 of the accumulator shift crank 469. The resulting clockwise movement of the latter will, through the forked accumulator shift arm 470, slide the accumulators 402 and 404 forwardly to a position in which the accumulator pinions 404 will be in position where they will be engaged with the segmental gears 76a. At the same time, the clockwise movement of the three-arm lever 456 will cause the slotted plate 476 to move forwardly from the position in which it is shown in Fig. 14 to an extent sufficient to cause the rod 484 to engage in the rearwardly extending end of the horizontal portion of the T-shaped slot 482. Thus, when the accumulator engaging beam 280 is raised, the accumulator pinions 404 will be brought into meshing engagement with their associated segmental gears 76a.

It is desirable, in each instance, prior to the taking of a subtotal, total, or credit balance, to cause a blank stroke operation of the machine, to make certain that all of the parts are in proper condition for the desired operation, even though in some instances such blank stroke may not be necessary. The machine should not be provided with a blank stroke insuring operation (such as shown in my copending application Serial No. 395,271, filed October 1, 1940), but instead the operator should, if the machine contains a negative balance, cause the machine to execute a blank cycle, using the "subtract" motor bar for this purpose, and, if the machine contains a positive total, should use the "add" motor bar for causing this blank cycle.

As previously indicated in connection with the description of the accumulator racks 50, the rack portions 62, 63, and 64 may be utilized to actuate additional pairs of accumulator pinions corresponding to the accumulator pinions 402 and 404. Such additional pairs of accumulators will be provided with selecting keys and mechanism similar to that above described with reference to Fig. 14 for the accumulators 402 and 404. Whenever the machine is equipped with such additional accumulators, the accumulator engaging beam 208 will be extended forwardly a sufficient distance to provide a properly positioned mounting for the slotted connecting plates corresponding to the plate 476 of Fig. 14.

The lower accumulators may constitute pairs of independent accumulators, such as the accumulators comprising the pinions 402 and 404 or, if it is desired to have more than one subtract accumulator, an accumulator assembly, such as the master accumulator shown herein, may be substituted for the pair of independent accumulators 402, 404.

It will be understood from the foregoing description that the master accumulators and the different pairs of lower accumulators may be more or less independently operated. For example, an amount may be added in any one or a plurality of the lower accumulators and at the same time added or subtracted in the master accumulator. This may be accomplished by setting up the item, pressing, for example, the key 424 to select the lower accumulator 404, and then pressing the subtract key 210. Under these circumstances, the accumulator pinions 404, as well as the subtract pinions 100, will be maintained disengaged from their respective segmental gears 76a, 76, during the rearward movement of the accumulator racks 50, while both of these sets of accumulator pinions will be brought into engagement with their respective segmental gears upon the forward movement of the accumulator racks 50.

If one or more of the pairs of lower accumulators is a subtract accumulator instead of a pair of independent accumulators, a wide variety of different additional calculating operations may be performed with facility. For example, an item may be added in one of the lower accumulators and subtracted in both the master accumulator and in one of the lower subtracting accumulators. Likewise, it will be possible, by proper manipulation of the control keys, to transfer amounts from one accumulator to another, the transfer being made either to subtract an item from one accumulator while adding it in another, or vice versa, or by simultaneously subtracting or adding the amount in two or more accumulators.

From the foregoing, it will be apparent that numerous other kinds of calculating operations may be performed by the machine by proper operation of the various control keys. Thus, any bookkeeping operation which requires the addition of an item in several different accounts or the subtraction of such item from a further different account, may readily be performed. This high degree of flexibility of the machine for performing a variety of different calculating operations makes it possible to use the machine with facility in a large variety of accounting operations and systems.

This great flexibility of the machine is obtained without the usual complexity of different interlocks and trains of controlling mechanism since the character of the operation to be performed by the machine is essentially controlled by the position of the stepped actuator bar 178, or the position of the various cam sectors. Because of the fact that the various cam sectors are rigidly connected together, it will be impossible to cause the machine to jam by failure to operate the proper controls, and such jamming is not prevented by the usual complicated interlocks, but merely by virtue of the fact that all of the important manually set controls operate to determine the position of all of the cam sectors.

The operation of the various trains of mechanism has been described in connection with the description of the individual parts thereof so that it would be repetitive to describe the operation of the machine. However, it may be stated generally that the machine is operated in the customary manner, with the difference that the keys 151 to 157, in addition to performing the function of selecting the character of the operation to be performed by the machine, also initiate the operating cycle, and, in this respect, perform the functions of a motor control bar. The usual motor bar is, however, provided for initiating ordinary adding operation cycles.

While I have shown and described a particular embodiment of my invention, it will be apparent to those skilled in the art that numerous variations and modifications may be made in the particular construction without departing from the underlying principles of the invention. I therefore desire, by the following claims, to include within the scope of my invention, all such variations and modifications whereby substantially the results of my invention may be obtained by the use of substantially the same or equivalent means.

I claim:

1. In a calculating machine, the combination of a movable frame, two sets of accumulator pinions carried by said frame, a plurality of toothed actuators alternatively engageable with said sets of pinions, an arm operatively connected to said frame to shift the latter, a lever connected to said arm, a shiftable selector having parts engageable with the ends of said lever, respectively, said selector having two positions of adjustment, in one of which only one of its parts is engageable with one end of said lever and in the other position of which the other of said selector parts is engageable with the other end of said lever, means to move said selector toward said lever to shift the latter, a plurality of control keys, a member differentially positioned by said control keys in any one of a plurality of positions, and means controlled by said member when the latter is in one of several of its possible positions to effect shifting of said selector.

2. In a calculating machine having an accumulator and means for differentially actuating the accumulator, the combination of means including a lost motion connection for moving said accumulator into and out of operative engagement with said actuating means, a latch for preventing relative movement of the parts of said lost motion connection, a plate having an irregular edge, a member engageable with the edge of said plate, a linkage connecting said member and said latch key, a key, and means controlled by said key to move said plate to a position in which it holds said latch in releasing position, thereby to render said lost motion connection effective to prevent said accumulator moving means from moving said accumulator.

3. In an adding machine capable of performing operating cycles of different character, such as adding, subtracting, total taking, subtotal taking, non-add, etc., and having a main shaft carrying cams, elements driven by said cams to effect said various operations; the combination of a plurality of selectively depressible keys for predetermining the character of the operating cycle to be performed by the machine, a member differentially positioned directly and solely under the control of said keys, a plurality of spaced parallel plates operatively connected to said members and having irregularities on their edges, there being one of said plates for each character of operating cycle to be performed, means maintaining said plates in selected position throughout the major portion of the operating cycle, and means cooperable with the irregularities of said plates effective to render said driven elements operative to cause an operating cycle of the machine corresponding to that determined by the control key depressed.

4. In a calculating machine, the combination of a plurality of sets of accumulator pinions, numeral key controlled differentially movable toothed actuators for engagement with said pinions, selector means for determining which of said sets of accumulator pinions shall engage said actuators, engaging means for causing meshing engagement with said actuators of the set of accumulator pinions selected by said selector means, a plurality of control keys, a plurality of control plates secured together in spaced parallel relation and movable as a unit from their normal position a distance selectively determined directly and solely by the operation of said control keys, means for holding said control plates in said position during the major portion of an operating cycle, means for returning said control plates to normal position at the completion of each operating cycle, mechanisms including parts having their positions controlled by said plates for determining the operation of said selector means and the operation of said engaging means, a main shaft, and means deriving power from said main shaft to move said control plates to selected position and other means to thereafter cause operation of said selector means and said engaging means.

5. In a calculating machine, the combination of a plurality of sets of accumulator pinions, numeral key controlled differentially movable toothed actuators for engagement with said pinions, selector means for determining which of said sets of accumulator pinions shall engage said actuators, engaging means for causing meshing engagement with said actuators of the set of accumulator pinions selected by said selector means, a plurality of control keys, a plurality of spaced parallel plates movable as a unit from normal position a distance selectively determined directly and solely by the operation of said control keys, mechanisms cooperable with said plates for determining the operation of said selector means and the operation of said engaging means, a main drive shaft, cams on said main shaft operable sequentially to move said control plates to selected position, operate said selector means, and operate said accumulator engaging means, and means to restore said plates to normal position upon the completion of each operating cycle.

THOMAS O. MEHAN.